United States Patent

[11] 3,622,621

[72] Inventor Robert B. Garland
Northbrook, Ill.
[21] Appl. No. 691,126
[22] Filed Dec. 18, 1967
[45] Patented Nov. 23, 1971
[73] Assignee G. D. Searle & Co.
Chicago, Ill.

[54] 2-ALKYL-N-ARYL-3-ARYLIMINO-1-CYCLOPENTEN-1-YLAMINE SALTS
5 Claims, No Drawings
[52] U.S. Cl. .................................................. 260/501.2,
260/566 R, 260/471 A, 424/316, 424/330,
424/308, 71/121, 71/111
[51] Int. Cl. ........................................................ C07c 87/50
[50] Field of Search ............................................ 260/566,
501.2

[56] References Cited
UNITED STATES PATENTS
3,462,488  8/1969  McBee et al. ................. 260/566

OTHER REFERENCES
Mill et al., J. Organic Chem. Vol. 28 pages 836–839 (1963)

Primary Examiner—Bernard Helfin
Assistant Examiner—Michael W. Glynn
Attorneys—John M. Brown, John J. Kolano, Elliot N. Schubert, Walter C. Ramm and Helmuth A. Wegner ABSTRACT: Preparation of the captioned compounds—for example, 2-methyl-N-phenyl-2-phenylimino-1-cyclopenten-1-ylamine p-toluenesulfonate—and their valuable biological properties—including antimicrobial activity in respect of protozoa such as *Tetrahymena gelleii*, bacteria such as *Diplococcus pneumoniae*, fungi such as *Trychophyton mentagrophytes*, and algae such as *Chlorella vulgaris*; antihypercholesterolemic activity; and the capacity to inhibit dicotyledonous seed germination—are disclosed.

2-ALKYL-N-ARYL-3-ARYLIMINO-1-CYCLOPENTEN-1-YLAMINE SALTS

This invention relates to 2-alkyl-N-aryl-3-arylimino-1-cyclopenten-1-ylamine salts, and processes for the preparation thereof. More particularly, this invention provides new, useful, and unobvious chemical compounds of the formula

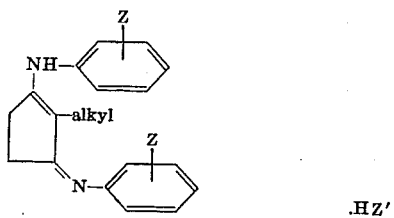

wherein Z represents hydrogen, halogen, or a nitro or alkoxycarbonyl radical and Z' represents chlorine, bromine, or an alkanesulfonyloxy, benzenesulfonyloxy, or toluene sulfonyloxy radical.

The alkyl grouping attached to the cyclopentene ring in the compounds of this invention, as also the alkyl constituent of the alkoxycarbonyl and alkanesulfonyloxy radicals represented by Z and Z' above, is preferably of lower order, e.g., methyl, ethyl, propyl, butyl, isobutyl, sec-butyl, tert-butyl, pentyl, neopentyl, hexyl, isohexyl or like monovalent, saturated, acyclic, straight- or branched-chain, hydrocarbon radical of empirical formula $-C_nH_{2n+1}$
wherein $n$ represents a positive integer less than 8. The halogens represented by Z above are preferably chlorine or bromine, their positioning and that of the other phenyl substituents represented by Z (relative to the points of attachment of the phenyl radicals to nitrogen) being acritical: ortho, meta, and para substitution alike are contemplated.

The compounds to which this invention relates are useful by reason of their valuable biological properties. Thus, for example, they are antiprotozoal, antibacterial, antifungal, antialgal, antihypercholesterolemic, and antigerminant.

The antiprotozoal utility of the instant compounds is evident from the results of a standardized test for their capacity to inhibit the growth of Tetrahymena gelleii. In this test, a nutrient broth consisting of 12 gm. of proteose peptone, 8 gm. of sucrose, and 1000 ml. of water is sterilized, inoculated with an axenic culture of the test organisms, and incubated at approximately 25° for 24 hr., whereupon 0.5 ml. quantities are aseptically transferred to each of two test tubes, one of which contains approximately 5 mg. of compound. After a second 24-hr. incubation at approximately 25°, growths of the organism are compared by microscopic examination. The products of Examples 1B, 2, and 5 hereinafter effected an approximately 50 percent inhibition of Tetrahymena gelleii when thus tested.

The antibacterial, antifungal, and antialgal utility of the instant compounds is evident from the results of standardized tests whereby sterile blood, Mycophil, and Bristol agar plates are inoculated with Diplococcus pneumoniae Trychophyton mentagrophytes, and Chlorella vulgaris, respectively; approximately 5 mg. of compound is placed on the surface of each plate so as to cover a circle approximately 4 mm. in diameter; and the plates are thereupon incubated in accordance with the following schedule:

| Organism | Time | Temp. | Artificial Light |
|---|---|---|---|
| D. pneumoniae | 24 hr. | 36° | no |
| T. mentagrophytes | 96 hr. | 25° | no |
| C. vulgaris | 5-7 days | 25° | yes |

Undecylenic acid and copper sulfate serve as reference standards in the latter two tests, respectively. Clear zones of inhibition signify the utility in question.

Antihypercholesterolemic utility is evident from the results of standardized tests for the capacity of a compound to counteract the increased plasma cholesterol induced in rats by the injection of Triton WR-1339 and described by Garattini et al. in "Drugs Affecting Lipid Metabolism," pp. 150ff, Elseveir, 1961. A group of eight male rats each weighing approximately 250 g. is used for each compound tested. Dosage is 50 mg. per kg. dissolved or suspended in 10 ml. per kg. of an aqueous 4 percent solution of the Triton and administered intraperitoneally. A corresponding group of eight rats each concurrently injected intraperitoneally with 10 ml. per kg. of aqueous 4 percent Triton WR-1339 containing no compound serves as controls. Exactly 18 hr. after injection the animals are anesthetized, whereupon blood samples are taken from the abdominal aortas and analyzed for cholesterol. A compound is considered antihypercholesterolemic if it significantly (P 0.05) decreases the mean cholesterol analysis relative to the control value. The product of example 2 hereinafter, tested via the foregoing procedure, produced a significant decrease in cholesterol amounting to approximately 12½percent.

The antigerminant activity of the instant compounds is evident from the results of a standardized test whereby three 42.5-mm. (diameter) filter paper discs are stacked in each of two 60-mm. Petri dishes, each stack is moistened with 2 ml. of distilled water, 10 white clover (Trifolium repens—a representative dicotyledon) seeds are arranged atop each stack at approximately equal intervals around the periphery, approximately 5 mg. of compound is placed in the center of one seed circle (the other serves as control), the dishes are covered with glass lids and then incubated at room temperatures for 10 days, and germination in the control dish is thereupon compared with that in the dish containing seeds exposed to test compound.

Those skilled in the art will recognize that observations of activity in standardized tests for particular biological effects are fundamental to the development of valuable new drugs, both veterinary and human. Distinct from such applications, antialgal compounds are adapted to the conditioning of boiler feedwater and the like, whereas antigerminant compounds serve as herbicides.

Preparation of the subject compounds proceeds by contacting an appropriate 2-alkyl-1,3-cyclopentanedione in a benzene medium containing a tertiary amine with an appropriate alkanesulfonyl, benzenesulfonyl, or toluenesulfonyl chloride to produce the corresponding 2-alkyl-1-oxo-2-cyclopenten-3-yl sulfonate, which is heated in dimethyl formamide with an appropriate arylamine

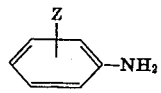

(Z being defined as before) to give the corresponding 2-alkyl-N-aryl-3-arylimino-1-cyclopenten-1-ylamine sulfonate. Alternatively, the selected 2-alkyl-1,3 cyclopentanedione is contacted in a chloroform medium with phosphorus trichloride or tribromide to produce the corresponding 2-alkyl-3-halo-2-cyclopenten-1-one, which is heated in dimethyl formamide with the selected arylamine to give the corresponding 2-alkyl-N-aryl-3-arylimino-1-cyclopenten-1-ylamine hydrohalide.

The following examples describe in detail compounds illustrative of the present invention and methods which have been devised for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

EXAMPLE 1

A. 2-Methyl-1-oxo-2-cyclopenten-3-yl p-toluene=sulfonate

To a suspension of 56 parts of 2-methyl-1,3-cyclopentanedione in 400 parts of benzene is added 100 parts of triethyl amine. The resultant mixture is stirred vigorously while 100 parts of p-toluenesulfonyl chloride is added in small portions with sufficient cooling to maintain a temperature of 25°. When the addition is completed, the mixture is stirred at 25° for 2 hr. and then filtered. The filtrate is washed with aqueous 10 percent sodium bicarbonate and water, dried over anhydrous sodium sulfate, mixed with decolorizing charcoal, and filtered. The resultant filtrate is concentrated to approximately one-fourth of its original volume by vacuum distillation, then diluted with 4 volumes of cyclohexane. The product which precipitates on cooling is filtered off and dried in air. It melts at approximately 78°–79°. This material is 2-methyl-1-oxo-2-cyclopenten-3-yl p-toluenesulfonate.

B. 2-Methyl-N-phenyl-3-phenylimino-1-cyclopenten-1-ylamine p-toluenesulfonate A solution of 53 parts of 2-methyl-1-oxo-2-cyclopenten-3-yl p-toluenesulfonate and 40 parts of aniline in 200 parts of dimethyl formamide is heated at 55°–60° for 18 hrs. and then chilled. The solid precipitate thrown down is filtered off and recrystallized from a mixture of methanol and ether to give 2-methyl-N-phenyl-3-phenylimino-1-cyclopenten-1-ylamine p-toluenesulfonate melting at approximately 263°–264°. The product has the formula

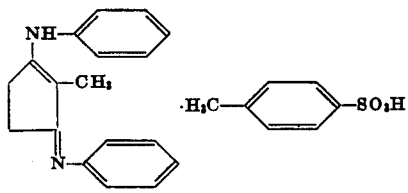

EXAMPLE 2

N-(p-Chlorophenyl)-3-(p-chlorophenylimino)-2-methyl-1-cyclopenten-1-ylamine p-toluenesulfonate A solution of 53 parts of 2-methyl-1-oxo-2-cyclopenten-3-yl p-toluenesulfonate and 58 parts of p-chloroaniline in 200 parts of dimethyl formamide is heated at 55°–60° for 18 hr., then chilled. The solid precipitate which forms is filtered off and washed by slurrying in warm methanol. The slurry is chilled and filtered. The solid product thus isolated is N-(p-chlorophenyl)-3-(p-chlorophenylimino)-2-methyl-1-cyclopenten-1-ylamine p-toluenesulfonate melting at 270°–272°. The product has the formula

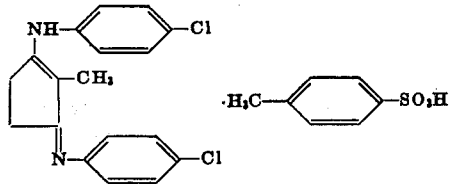

EXAMPLE 3

A. 3-Chloro-2-methyl-2-cyclopenten-1-one

To a suspension of 56 parts of 2-methyl-1,3-cyclopentanedione in 1490 parts of chloroform is added, slowly and with stirring, 40 parts of phosphorus trichloride. The resultant mixture is stirred at the boiling point under reflux for 20 hr., then cooled. Insoluble solids are removed by filtration, and the filtrate is stripped of solvent by vacuum distillation. Ice is added to the residue, and the resultant mixture is extracted with ether. The ether extract is washed with aqueous 10 percent sodium bicarbonate and water, dried over anhydrous sodium sulfate, and filtered. The filtrate thus obtained is stripped of solvent by distillation, and the residue is vacuum distilled. The fraction coming over at 67°–71°/7 mm. pressure is 3-chloro-2-methyl-2-cyclopenten-1-one.

B. N-(o-Bromophenyl)-3-(o-bromophenylimino)-2-methyl-1-cyclopenten-1-ylamine hydrochloride A solution of 26 parts of 3-chloro-2-methyl-2-cyclopenten-1-one and 75 parts of o-bromoaniline in 200 parts of dimethyl formamide is heated at 55°–60° for 20 hr., then stripped of solvent by vacuum distillation. The residue, upon trituration with ether, affords crystalline N-(o-bromophenyl)-3-(o-bromophenylimino)-2-methyl-1-cyclopenten-1-ylamine hydrochloride. The product has the formula

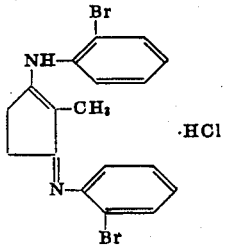

EXAMPLE 4

2-Methyl-N-(p-nitrophenyl)-3-(p-nitrophenylimino)-1-cyclopenten-1-ylamine p-toluenesulfonate A solution of 53 parts of 2-methyl-1-oxo-2-cyclopenten-3-yl p-toluenesulfonate and 60 parts of p-nitroaniline in 200 parts of dimethyl formamide is heated at 55°–60° for 18 hr. The solution is then stripped of solvent by vacuum distillation, and the residue is triturated with ether. The solid material which results is filtered off and recrystallized from methanol to give 2-methyl-N-(p-nitrophenyl)-3-(p-nitrophenylimino)-1-cyclopenten-1-ylamine p-toluenesulfonate melting at 268°–270°. The product has the formula

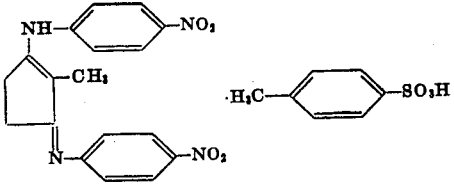

EXAMPLE 5

N-(p-Ethoxycarbonylphenyl)-3-(p-ethoxycarbonyl=phenylimino)-2-methyl-1-cyclopenten-1-ylamine -p-toluene=sulfonate.

A solution of 53 parts of 2-methyl-1-oxo-2-cyclopenten-3-yl p-toluenesulfonate and 70 parts of ethyl p-aminobenzoate in 200 parts of dimethyl formamide is heated at 55°–60° for 18 hr. The resultant mixture is chilled, whereupon insoluble solids are removed by filtration and washed by slurrying in warm ethanol. The slurry is chilled and the solid product recovered therefrom by filtration. The material thus isolated is N-(p-ethoxycarbonylphenyl)-3-(p-ethoxycarbonylphenylimino)-2-methyl-1-cyclopenten-1-ylamine p-toluenesulfonate melting at 232°–235°. It has the formula

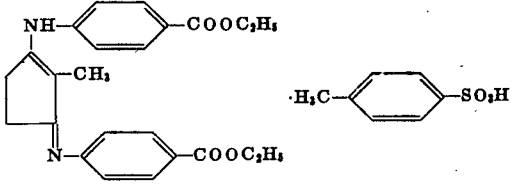

What is claimed is:
1. A compound of the formula

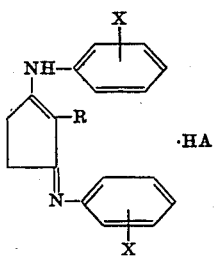

wherein X is hydrogen, chlorine, bromine, or nitro and the position of X with respect to the point of attachment of the benzene ring in which it appears is the same in both occurrences thereof; R is lower alkyl; and A is chlorine, bromine, or p-toluene=sulfonyloxy.

2. A compound according to claim 1 wherein X is in the para position, R is methyl, and A is p-toluenesulfonyloxy.

3. A compound according to claim 1 which is 2-methyl-N-phenyl-3-phenylimino-1-cyclopenten-1-ylamine p-toluenesulfonate.

4. A compound according to claim 1 which is N-(p-chlorophenyl)-3-(P-chlorophenylimino)-2-methyl-1-cyclopenten1-ylamine p-toluenesulfonate.

5. A compound according to claim 1 which is 2-methyl-N-(p-nitrophenyl)-3-(p-nitrophenylimino)-1-cyclopenten-1-ylamine p-toluenesulfonate.

* * * * *